UNITED STATES PATENT OFFICE.

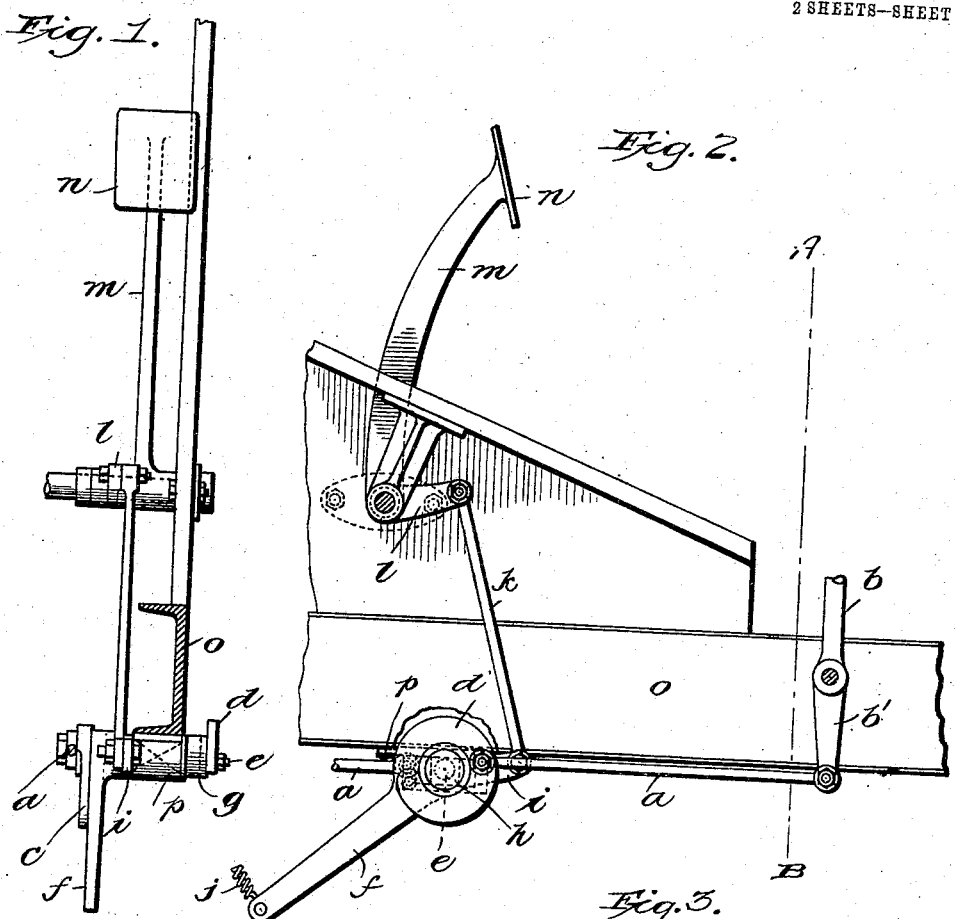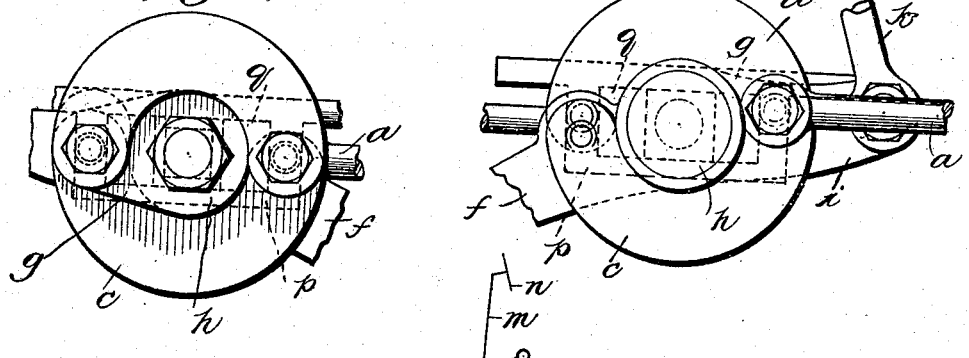

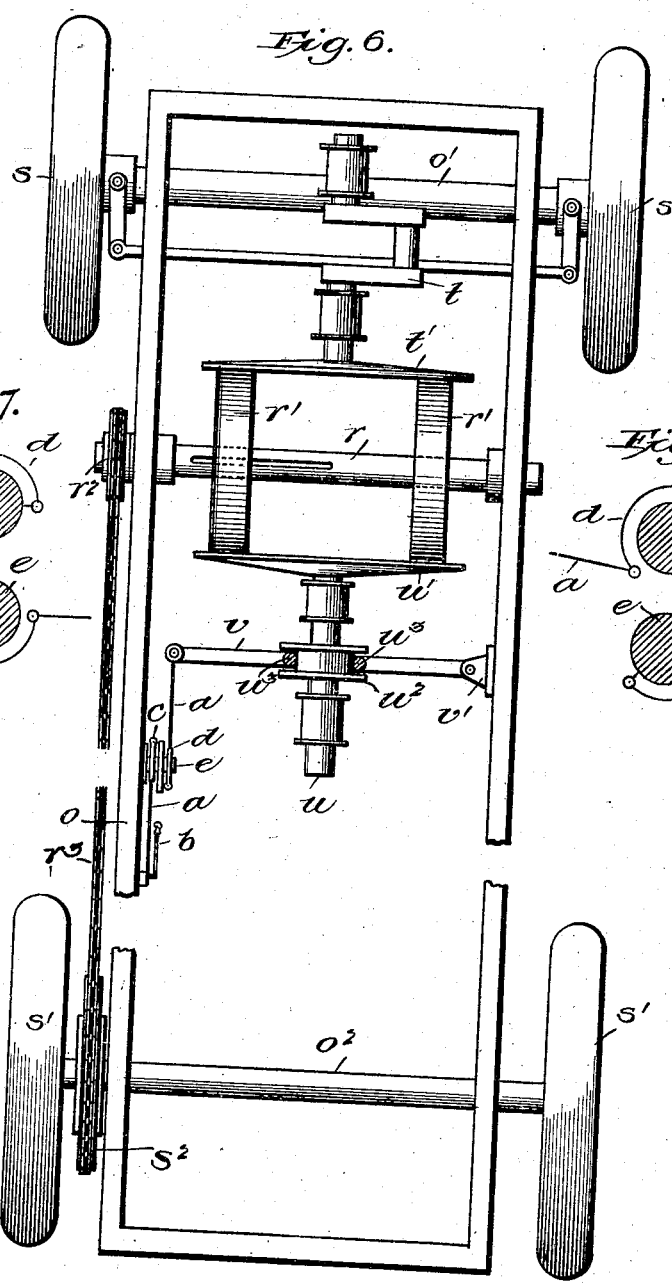
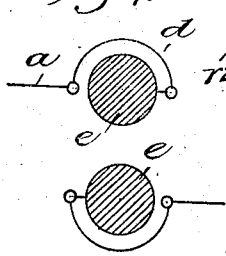
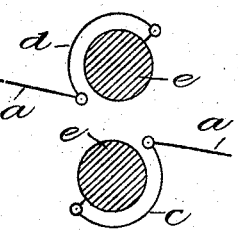

LUDWIG MAURER, OF NUREMBERG, GERMANY.

GEARING.

No. 858,614.　　　　　　Specification of Letters Patent.　　　　　　Patented July 2, 1907.

Application filed May 7, 1906. Serial No. 315,538.

*To all whom it may concern:*

Be it known that I, LUDWIG MAURER, a citizen of the Empire of Germany, residing at Nuremberg, in the Empire of Germany, have invented a new and useful Gearing, of which the following is a specification.

My invention relates to improvements in mechanism for engaging and disengaging friction gearing of motor-cars, whereby it is rendered possible to utilize one and the same rod, which presses a friction disk against friction wheels, for two purposes, a hand-lever being employed for regulating the pressure between the friction wheels and a treadle being employed for throwing the friction gearing out of gear.

The objects of my improvement are, first, to divide the said rod and to dispose its two parts in two parallel vertical planes; second, to dispose between the two opposite ends of the rod a cross shaft, which is mounted to rock in a bearing guided in a longitudinal guide on the car-frame; third, to fasten on the cross shaft a lever and a two-armed lever, the one arm of which is normally subjected to the action of a helical spring and the other arm of which is pivotally connected with a treadle by means of suitable parts; fourth, to provide two opposite semi-circular links, of which the one connects said lever with the end of one rod part and the other one connects the one arm of said two-armed lever with the end of the other rod part, so that the helical spring normally extends the rod and presses the friction disk against the friction wheels and the treadle when depressed will contract the rod and put the friction gearing out of gear.

I will now proceed to describe my invention with reference to the accompanying drawings, in which—

Figure 1 is a vertical cross section through the one side portion of the car-frame and through the rear part of the rod on the broken line A—B in Fig. 2, seen from right to left in this figure, that is to say from the driver's seat, and shows in a side view a treadle, a slotted guide beneath the frame, a bearing therein, a cross shaft rocking in this bearing and parts pivotally connecting said cross shaft on the one hand with the treadle and on the other hand with the two rod parts, Fig. 2 is an elevation of these parts, a part of the hand-lever and a part of the car-frame, Fig. 3 shows on an enlarged scale a part out of Fig. 2, Fig. 4 shows the same part, seen from the opposite side, Fig. 5 shows diagrammatically the parts connecting the cross shaft with the treadle and with the two rod parts, Fig. 6 is a plan on a reduced scale of the frame and wheels of the motor-car, a crank shaft, a friction gearing and the engaging and disengaging gear, the latter being shown diagrammatically, and Figs. 7 and 8 are diagrams, which will be referred to later on.

Similar letters of reference refer to similar parts throughout the several views.

The motor-car is assumed to comprise a rectangular frame $o$ (Fig. 6), a front axle $o^1$ with two steering wheels $s\ s$ of any known construction, a rear axle $o^2$ with two rear wheels $s^1\ s^1$ and a chain wheel $s^2$, a motor (not shown) of any known construction with a crank shaft $t$ and a driving friction wheel $t^1$, a cross shaft $r$ with two friction wheels $r^1 r^1$ (one of which is longitudinally adjustable on the shaft and the other is loose thereon), and a chain wheel $r^2$, and an endless driving chain $r^3$ connecting the two chain wheels $r^2$ and $s^2$. I do not further describe these parts, as they are immaterial to my invention. In suitable bearings a shaft $u$ in the axis of the crank shaft $t$ is mounted to turn and to longitudinally move and has fastened on it a friction disk $u^1$ and a grooved disk $u^2$, in the groove of which latter a two-part ring $u^3$ is mounted to turn. This ring $u^3$ has two opposite pins, which in a known manner engage in the respective holes of two parallel levers $v$, which latter are mounted to rock in a suitable bearing $v^1$ on the right portion of the frame $o$. Hitherto the free ends of the two levers $v$ were pivotally connected direct with the lower arm $b^1$ of a hand-lever $b$ by means of a rod $a$, so that some spring disposed somewhere or the driver by drawing the hand-lever $b$ would press the friction disk $u^1$ with the two friction wheels $r^1\ r^1$ against the opposite friction disk with the aid of the rod $a$, the levers $v$, the ring $u^3$, the disk $u^2$ and the shaft $u$. Thereby a friction will be produced for driving the left friction wheel $r^1$ and by its spline also the cross shaft $r$, while the right friction wheel $r^1$ will run loosely on the shaft $r$ and in the opposite direction. The power will then be transmitted from the chain wheel $r^2$ to the other chain wheel $s^2$ on the rear axle $o^2$ by means of the endless chain $r^3$. Thereby of course the motor-car will be put into motion.

According to my invention the rod $a$ is divided and its two parts are disposed in two parallel vertical planes, see Fig. 6. Between the two opposite ends of the two rod parts $a\ a$ a short cross shaft $e$ is mounted to rock in a bearing $h$ of square cross section, which bearing $h$ is movable in a horizontal rectangular slot $q$ of a guide $p$ fastened on the under-side of the frame $o$, see Figs. 1 and 2. On the shaft $e$ are fastened an arm $g$ and a two-armed lever $f\ i$. The arm $g$ is pivotally connected with the front rod part $a$ by means of a semicircular link $d$, which passes around the shaft $e$. The long arm $f$ is normally pressed upward by a helical spring $j$ and a point intermediate its two ends is pivotally connected with the rear rod part $a$ by means of another semicircular link $c$. The short arm $i$ of the two-armed lever $f\ i$ is pivotally connected by a rod $k$ with the short arm $l$ of a bell-crank lever, the long arm $m$ of which carries a treadle 10.

In order to better explain the various positions of the two semicircular links $c$ and $d$, they are separately shown one beneath the other at Figs. 7 and 8, as if there were two separate cross shafts $e$ $e$, while in reality there is a single shaft $e$ (see Figs. 1, 2, 3, 4 and 5).

Normally the helical spring $j$ brings the levers $f$ $i$ and $g$ into such a position, that the two rod parts $a$ $a$ are in two parallel horizontal planes, which are at a very small distance from each other, so that the two rod parts $a$ $a$ are extended. The helical spring $j$ is arranged for normally pressing the friction disk $u^1$ with the two friction wheels $r^1$ $r^1$ against the opposite friction disk $t^1$ and thereby for producing a pressure between the friction disks $t^1$ and $u^1$, while the hand-lever $b$ serves for regulating the power to be transmitted to the motor-car. This is permitted by the guide $p$, in which the bearing $h$ with the cross shaft $e$ and the parts therewith connected can move horizontally.

If the driver pushes the treadle $n$ forward, the two-armed lever $f$ $i$ and the arm $g$ with the cross shaft $e$ will be thereby turned through an angle approximately shown at Fig. 8, so that the two rod parts $a$ $a$ will be moved nearer each other, in other words the rod $a$ $a$ will be contracted. The consequence of this will be, that the friction disk $u^1$ will be moved away from the two friction wheels $r^1$ $r^1$, so that no more power will be transmitted to the motor-car and the latter will stop.

The engaging and disengaging mechanism described may be varied without departing from the spirit of my invention.

What I claim as my invention, and desire to secure by Letters Patent, is—

1. In a motor-car, the combination with the frame, and a friction gearing adapted to drive the motor-car, of a shaft longitudinally movable and turnable in the frame, a friction disk fastened on said shaft, a rod in two parts, of which the one is adapted to press said shaft with said friction disk against said friction gearing, a hand-lever pivotally connected with the other part of said rod and adapted to regulate the pressure between said friction disk and said friction gearing, means for normally extending the two parts of said rod and for pressing said friction disk against said friction gearing, a treadle, and means controlled by said treadle for contracting the two parts of said rod and thereby for throwing said friction gearing out of gear.

2. In a motor-car, the combination with the frame, and a friction gearing adapted to drive the motor-car, of a shaft longitudinally movable and turnable in the frame, a friction disk fastened on said shaft, a rod in two parts, of which the one is adapted to press said shaft with said friction disk against said friction gearing, a bearing movable in the frame in the direction of said rod, a cross shaft mounted to rock in said bearing, an arm fastened on said cross shaft and pivotally connected with the one part of said rod, a two-armed lever fastened on said cross shaft, its one arm being pivotally connected with the other part of said rod, a spring acting on said two-armed lever for normally extending the two parts of said rod and for normally pressing said friction disk against said friction gearing, a hand-lever pivotally connected with the other part of said rod and adapted to regulate the pressure between said friction disk and said friction gearing, a treadle, and connections between said treadle and said two-armed lever, so that on said treadle being depressed the two parts of said rod will be contracted for throwing said friction gearing out of gear.

In testimony whereof I have signed my name to this specification in the presence of two subscribing witnesses.

LUDWIG MAURER.

Witnesses:
HEINRICH SCHIMMEL, Sen.,
JULIUS MAURER.